United States Patent
Kojima et al.

(10) Patent No.: US 9,666,368 B2
(45) Date of Patent: May 30, 2017

(54) FILM CAPACITOR

(71) Applicant: KOJIMA INDUSTRIES CORPORATION, Toyota-Shi (JP)

(72) Inventors: Yoichiro Kojima, Toyota (JP); Kensuke Suenami, Toyota (JP)

(73) Assignee: Kojima Industries Corporation, Toyota-Shi (JP)

( * ) Notice: Subject to any disclaimer, the term of this patent is extended or adjusted under 35 U.S.C. 154(b) by 27 days.

(21) Appl. No.: 14/924,088

(22) Filed: Oct. 27, 2015

(65) Prior Publication Data

US 2016/0055974 A1 Feb. 25, 2016

Related U.S. Application Data

(63) Continuation of application No. PCT/JP2013/062723, filed on May 1, 2013.

(51) Int. Cl.
| | |
|---|---|
| *H01G 4/224* | (2006.01) |
| *H01G 2/10* | (2006.01) |
| *H01G 4/10* | (2006.01) |
| *H01G 4/30* | (2006.01) |
| *H01G 4/18* | (2006.01) |
| *H01G 4/248* | (2006.01) |

(52) U.S. Cl.
CPC ............ *H01G 4/10* (2013.01); *H01G 4/18* (2013.01); *H01G 4/224* (2013.01); *H01G 4/248* (2013.01); *H01G 4/30* (2013.01)

(58) Field of Classification Search
CPC  H01G 4/224; H01G 4/30; H01G 2/10; H01G 4/14; H01G 4/18
See application file for complete search history.

(56) References Cited

U.S. PATENT DOCUMENTS 5,331,504 A    7/1994  Kamiya et al.
2004/0226647 A1*  11/2004  Ito .................... B32B 18/00
                                                           156/89.11

(Continued)

FOREIGN PATENT DOCUMENTS

| JP | 63-065613 A1 | 3/1988 |
| JP | 64-017419 A1 | 1/1989 |
| JP | 03-241813 A1 | 10/1991 |

(Continued)

OTHER PUBLICATIONS

International Search Report (Application No. PCT/JP2013/062723) dated Jul. 9, 2013.

*Primary Examiner* — Dion R Ferguson
(74) *Attorney, Agent, or Firm* — Burr & Brown, PLLC

(57) ABSTRACT

A film capacitor having: a stack of at least one dielectric resin film formed of polypropylene and a plurality of vapor-deposited metal films which are superposed on each other such that the at least one dielectric film and the plurality of vapor-deposited metal films are alternately arranged; and two external electrodes formed on a pair of side surfaces of the stack; wherein cover films are formed of a polyolefin-based hot-melt resin on a pair of side surfaces of the stack other than the side surfaces on which the two external electrodes are formed, such that the cover films cover entireties of those side surfaces and are fusion-bonded to end faces of the at least one dielectric film exposed at those side surfaces.

3 Claims, 2 Drawing Sheets

(56) References Cited

U.S. PATENT DOCUMENTS

2012/0033342 A1 2/2012 Ito et al.
2014/0301018 A1* 10/2014 Ichinose .................. H01G 4/32
361/301.5

FOREIGN PATENT DOCUMENTS

| JP | 05-182863 A1 | 7/1993 |
| JP | 05-063094 B2 | 9/1993 |
| JP | 09-153434 A1 | 6/1997 |
| JP | 2001-297945 A1 | 10/2001 |
| JP | 2003-338424 A1 | 11/2003 |
| JP | 2011-181885 A1 | 9/2011 |
| JP | 2012-038946 A1 | 2/2012 |

* cited by examiner

FILM CAPACITOR

CROSS REFERENCE TO RELATED APPLICATION

This application is a continuation of the International Application No. PCT/JP2013/062723 filed on May 1, 2013, the entireties of which are incorporated herein by reference.

BACKGROUND OF THE INVENTION

Field of the Invention

The present invention relates to improvements in a stacked film capacitor formed by using a stack having a structure in which at least one resin dielectric film and a plurality of vapor-deposited metal films are alternately superposed on each other.

Description of Related Art

A capacitor has been used in various kinds of electronic devices and electric devices. In recent years, a film capacitor is widely used in the electronic devices and the electric devices to meet a demand for downsizing of those devices. The film capacitor has various structures. As a kind of the film capacitor, a stacked film capacitor disclosed in JP-A-9-153434, for example, is known. This film capacitor is formed by using a stack obtained by superposing metallized films on each other. Each metallized film is constituted by a dielectric film in the form of a resin film and vapor-deposited metal film(s) provided on one or both of opposite major surfaces of the resin film. The metallized films are superposed on each other such that the resin films and the vapor-deposited metal films are alternately arranged. Protective films are superposed on respective opposite surfaces of the thus obtained stack, which surfaces are opposite to each other in a direction of superposition of the metallized films, whereby a film capacitor element is obtained. On the other hand, external electrodes are formed on respective two side surfaces of the film capacitor element, which side surfaces are opposite to each other in a direction perpendicular to the direction of superposition of the metallized films, whereby the film capacitor is obtained.

Further, JP-A-2011-181885, for example, proposes a film capacitor formed by using a stack of vapor-deposited metal films and dielectric films in the form of vapor-deposited polymer films each of which can be formed with a thickness on the order of nanometer, and superposing protective films on respective opposite surfaces of the stack, thereby forming a film capacitor element, and forming external electrodes on two opposite side surfaces of the film capacitor element. This film capacitor can be made with a smaller size than the above-described film capacitor.

Namely, the conventional stacked film capacitor is generally formed by using a film capacitor element consisting of a stack in which at least one resin dielectric film and a plurality of vapor-deposited metal films are alternately superposed on each other, and protective films on respective opposite surfaces of the film capacitor element, which surfaces are opposite to each other in the direction of superposition of the at least one dielectric film and the vapor-deposited metal films, and forming external electrodes on a pair of side surfaces of the film capacitor element.

By the way, in the conventional stacked film capacitor described above, two side surfaces of the film capacitor other than the two side surfaces on which the external electrodes are formed, namely, the two side surfaces adjacent to the latter two side surfaces are exposed to the outside of the film capacitor. Accordingly, where the stacked film capacitor is used in such a state, a large leakage current might be generated from those exposed side surfaces, and a gas such as a water vapor might enter the inside of the film capacitor through those side surfaces, leading to deterioration of the dielectric films and the vapor-deposited metal films. As a result, there arises a risk of reduction of the performance of the film capacitor. Further, in recent years, the thickness of the dielectric films is reduced to reduce the size of the stacked film capacitor. Therefore, in such a stacked film capacitor, a creepage distance between the adjacent two vapor-deposited metal films disposed on the respective opposite sides of each dielectric film is reduced, so that electricity is easily conducted between the adjacent two vapor-deposited metal films, resulting in a tendency of reduction of the withstand voltage of the film capacitor.

In order to prevent the above-described problems, there has been taken measures for insulating the side surfaces of the film capacitor adjacent to the side surfaces on which the external electrodes are formed, from the outside of the film capacitor, by accommodating the film capacitor in a casing, and filling a space between the film capacitor and inner surfaces of the casing with a resin such as an epoxy resin having an electrical insulation property, as disclosed in JP-A-2003-338424, for example. However, the film capacitor accommodated within the casing together with the resin, namely, a so-called cased film capacitor has a larger size due to the presence of the casing, and inevitably requires an extra cost.

Under the circumstances described above, JP-B-5-63094 discloses a film capacitor in which cover films are formed on the two side surfaces of the film capacitor element (stack of the metallized films) other than the two side surfaces on which the external electrodes are formed, such that entireties of the former two side surfaces are covered by the cover films. Where the film capacitor is constructed as described above, the side surfaces of the film capacitor adjacent to the side surfaces on which the external electrodes are formed can be insulated from the outside of the film capacitor, without accommodating the film capacitor within the casing.

However, the inventors of the present invention made various studies on the above-described so-called covered film capacitor obtained by forming the cover films on its exposed side surfaces, and found that the covered film capacitor has inherent problems as described below.

Namely, in the conventional covered film capacitor, the dielectric films are formed of a thermoplastic resin such as polyethylene terephthalate, whereas the cover films are formed of an epoxy-based thermosetting resin which is completely different from the resin of the dielectric films. Accordingly, sufficiently high adhesiveness between the cover films and end faces of of the dielectric films defining parts of the side surfaces of the film capacitor covered by the cover films cannot be assured, so that small gaps are inevitably formed between the cover films and the above-described end faces of the dielectric films. Therefore, in the conventional covered film capacitor, the water vapor, the air and the like enter the small gaps formed between the cover films and the above-described end faces of the dielectric films, resulting in extreme difficulties in surely preventing the problem of deterioration of the dielectric films and the vapor-deposited metal films due to their contact with the water vapor, and the problem of reduction of the withstand voltage of the film capacitor due to electric discharge between the vapor-deposited metal films.

SUMMARY OF THE INVENTION

The present invention was made in view of the background art described above. It is therefore an object of the invention to provide an improved structure of the stacked film capacitor configured so as to surely solve the problems of generation of leakage current, deterioration of the dielectric films and the vapor-deposited metal films due to their contact with the water vapor, and reduction of the withstand voltage of the film capacitor due to the electric discharge between the vapor-deposited metal films, without increasing the size of the film capacitor and the cost of its production.

In order to achieve the above-described object, the present invention provides a film capacitor constituted by: a stack of at least one dielectric film in the form of a polypropylene film and a plurality of vapor-deposited metal films which are superposed on each other such that the at least one dielectric film and the plurality of vapor-deposited metal films are alternately arranged; protective films superposed on respective opposite surfaces of the stack as seen in a direction of superposition of the at least one dielectric film and the plurality of vapor-deposited metal films; and two external electrodes formed on respective opposite side surfaces of the stack as seen in a direction perpendicular to the direction of superposition of the at least one dielectric film and the plurality of vapor-deposited metal films, wherein cover films are formed of a polyolefin-based hot-melt resin on respective opposite side surfaces of the stack other than the above-described side surfaces on which the above-described two external electrodes are formed, such that the cover films cover entireties of those side surfaces and are fusion-bonded to end portions of the at least one dielectric film exposed at those side surfaces.

According to a preferable form of the invention, the cover films have: a melting point which is not lower than that of polypropylene of the at least one dielectric film and lower than a pyrolysis temperature of polypropylene; and a melt viscosity within a range of 860-340000 mPa·s at 160-180° C. In this respect, it is noted that the melt viscosity is measured by a test conducted according to WS K 6862.

According to an advantageous form of the invention, gaps are formed in the above-described opposite side surfaces of the stack as seen in the direction perpendicular to the direction of superposition of the at least one dielectric film and the plurality of vapor-deposited metal films, such that the gaps are open outwards and parts of the plurality of vapor-deposited metal films are exposed to the outside of the stack through the gaps, and portions of the above-described two external electrodes formed on the above-described respective opposite side surfaces of the stack fill the gaps, and the portions of one of the two external electrodes filling the gaps formed in one of the above-described respective opposite side surfaces of the stack are defined as first connecting portions connecting the above-described one external electrode formed on the above-described one side surface of the stack to the above-described parts of the vapor-deposited metal films exposed to the gaps, while the portions of the other of the two external electrodes filling the gaps formed in the other of the above-described respective opposite side surfaces of the stack are defined as second connecting portions connecting the above-described other external electrode formed on the above-described other side surface of the stack to the above-described parts of the vapor-deposited metal films exposed to the gaps, wherein the first connecting portions and the second connecting portions are alternately arranged as seen in the direction of superposition of the at least one dielectric film and the plurality of vapor-deposited metal films.

Namely, in the film capacitor according to the invention, the two cover films are formed so as to cover the entireties of the two side surfaces of the stack adjacent to the other two side surfaces on which the external electrodes are formed. As a result, the problem of generation of leakage current from the side surfaces can be substantially solved, and the creepage distance between the vapor-deposited metal films can be advantageously increased. Further, the two cover films are formed of the polyolefin-based hot-melt resin belonging to the same system as polypropylene of the at least one dielectric film, and fusion-bonded to the end portions of the at least one dielectric film disposed on the sides of the respective opposite side surfaces of the film capacitor covered by the cover films. Accordingly, the cover films more strongly and completely adhere to the end faces of the above-described end portions of the at least one dielectric film, in the absence of formation of small gaps between the end faces of the at least one dielectric film and the cover films. Therefore, in the film capacitor of the invention, entry of the water vapor and the air between the end faces (end portions) of the at least one dielectric film and the cover films is extremely effectively and surely prevented. Further, in the film capacitor of the invention, the creepage distance between the vapor-deposited metal films is increased. As a result, the problem of deterioration of the at least one dielectric film and the vapor-deposited metal films due to their contact with the water vapor, and the problem of reduction of the withstand voltage of the film capacitor due to electric discharge between the vapor-deposited metal films can be advantageously solved.

Further, unlike the conventional cased film capacitor, the film capacitor of the invention has no casing, so that the size of the film capacitor is not increased and no extra cost is required.

Therefore, in the film capacitor according to the invention, the generation of leakage current can be substantially prevented, and the desired performance can be maintained with a high degree of stability for a longer period of time, while the withstand voltage can be extremely advantageously increased, without undesirable increases of the size and the cost of production of the film capacitor.

DETAILED DESCRIPTION OF THE INVENTION

To clarify the invention more specifically, one embodiment of the invention will be described by reference to the drawings.

Figure 1:
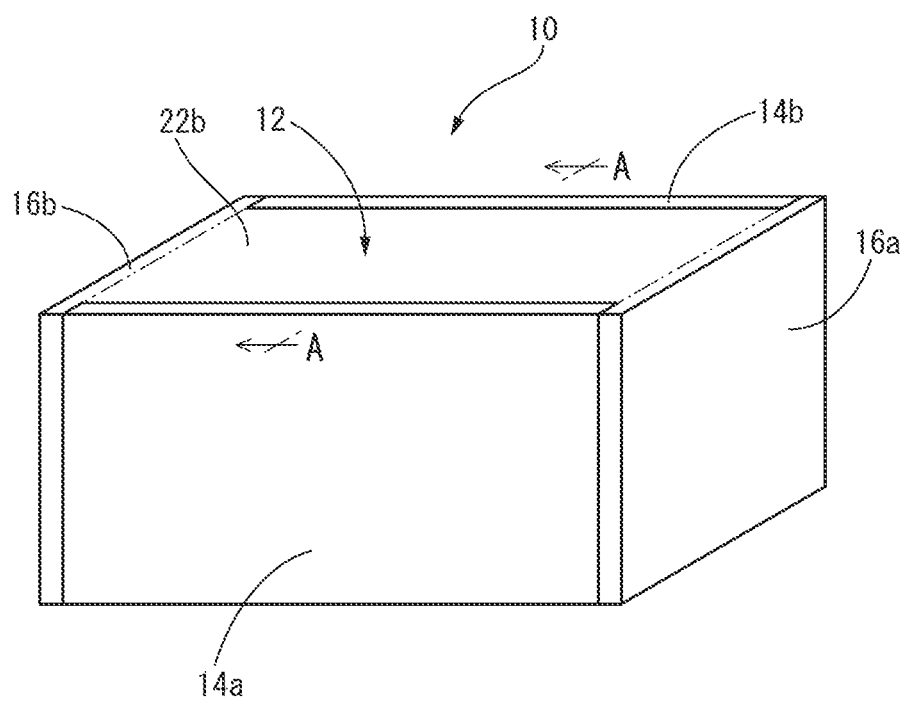
FIG. 1 is a schematic perspective view showing a film capacitor having a structure according to one embodiment of the invention.

Referring first to the perspective view of FIG. 1, there is shown a film capacitor 10 to be installed in an automotive vehicle or the like, as the film capacitor having a structure according to one embodiment of the invention. As is apparent from FIG. 1, the film capacitor 10 of this embodiment has a film capacitor element 12, external electrodes 14a and 14b formed on respective two side surfaces of the film capacitor element 12, which side surfaces are opposite to each other in a direction of the width of the film capacitor element 12, and cover films 16a and 16b formed on respective two side surfaces of the film capacitor element 12, which side surfaces are other than the side surfaces on which the external electrodes 14a and 14b are formed, and opposite to each other in a direction of the length of the film capacitor element 12.

Figure 2:
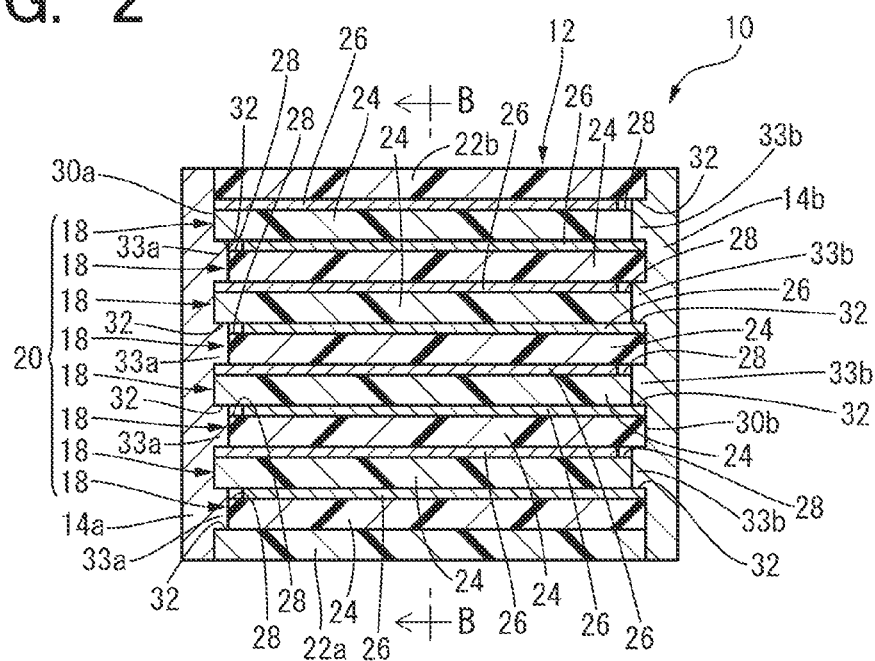
FIG. 2 is an enlarged cross sectional view taken along a line A-A in FIG. 1.
Figure 3:
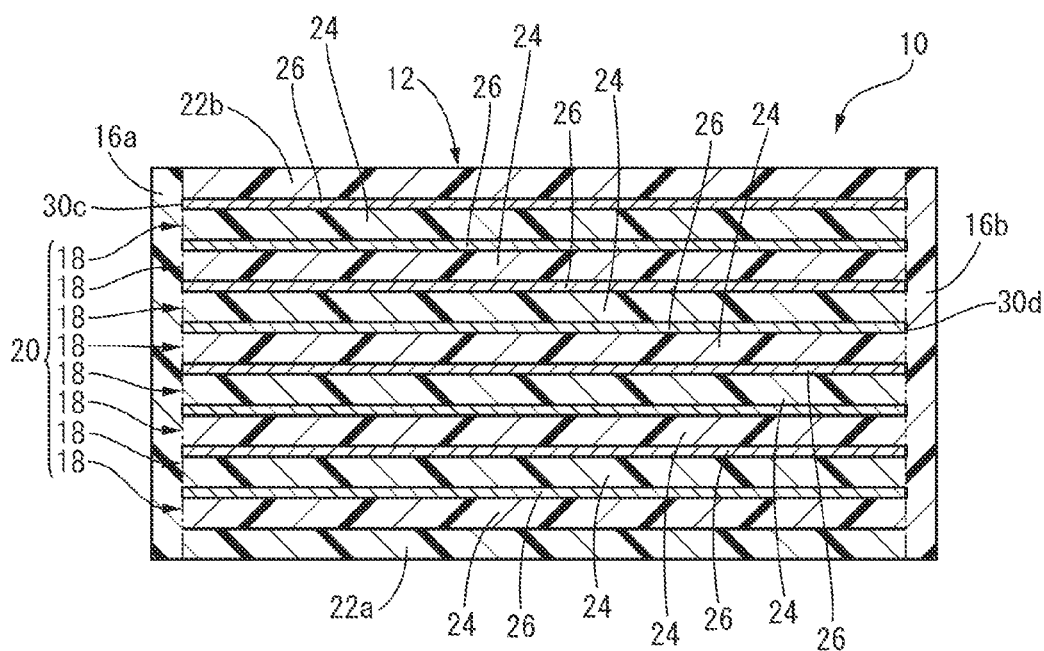
FIG. 3 is a cross sectional view taken along a line B-B in FIG. 2.

More specifically described, as shown in FIGS. 2 and 3, the film capacitor element 12 has a stack 20 constituted by a plurality of metalized films 18 (8 metallized films 18 in this embodiment) superposed on each other. A protective film 22a is superposed on one of opposite surfaces (lower surface) of the stack 20 as seen in its thickness direction (direction of superposition of the metallized films 18), while a protective film 22b is superposed on the other of the above-described opposite surfaces (upper surface) of the stack 20, whereby the film capacitor element 12 is constituted by the stack 20 and the protective films 22a and 22b. In this respect, it is noted that the number of the metallized films 18 of the film capacitor element 12 (stack 20) is not limited to that described above.

Each of the metallized films 18 of the film capacitor element 12 is constituted by a resin film 24 as a dielectric film and a vapor-deposited metal film 26 formed on one of opposite major surfaces of the resin film 24. In one of opposite end portions of the metallized film 18 as seen in its width direction (right to left direction as seen in FIG. 2), there is a margin portion 28 in which the vapor-deposited metal film 26 is not formed on the resin film 24.

In this embodiment, the resin film 24 of the metallized film 18 is a bi-axially stretched film formed of polypropylene, while the vapor-deposited metal film 26 is formed of aluminum or zinc, for example. The resin film 24 need to be formed of polypropylene, but need not to be the bi-axially stretched film. The metallic material of the vapor-deposited metal film 26 is not particularly limited, as long as the material has a sufficiently high degree of electric conductivity and can be formed into the film by performing a conventional vapor-deposition process known as PVD or CVD, on the resin film 24.

In this embodiment, the protective films 22a and 22b are bi-axially stretched films formed of polypropylene. Although the material of the protective films 22a and 22b is not particularly limited as long as the material has a high electric insulation property, resin films formed of the same resin material as the resin film 24 of the metallized film 18 are generally used as the protective films 22a and 22b.

The thicknesses of the resin film 24 and the vapor-deposited metal film 26 of the metallized film 18, and the thicknesses of the protective films 22a and 22b are not particularly limited, but the thickness of the resin film 24 is generally held between about 2.0 μm and about 4.0 μm, and the thickness of the vapor-deposited metal film 26 is generally held between about 100 Å and about 300 Å, while the thickness of the protective films 22a and 22b is generally held between about 7.0 μm and about 30 μm. In this respect, it is to be understood that in FIGS. 2 and 3, the resin film 24 and the vapor-deposited metal film 26 of the metallized film 18, the protective films 22a and 22b, the cover films 16a and 16b and the external electrodes 14a and 14b are shown with exaggeratedly large thicknesses, and the number of superposition of the metallized films 18 of the film capacitor element 12 shown in FIGS. 2 and 3 is extremely smaller than the actual number, for easy understanding of the structure of the film capacitor 10.

In the film capacitor element 12 having a laminar structure constituted by the stack 20 of the plurality of metallized films 18 and the two protective films 22a and 22b, the plurality of metallized films 18 are superposed on each other such that the resin films 24 and the vapor-deposited metal films 26 are alternately arranged, and such that the margin portions 28 of the adjacent two metallized films 18 are disposed on respective opposite end portions of the film capacitor element 12 as seen in its width direction (right to left direction as seen in FIG. 2).

In the film capacitor element 12, the adjacent two metallized films 18 are superposed on each other such that a widthwise end portion of one of the adjacent two metallized films 18 laterally projects from the end face of the other metallized film 18 on the side of its margin portion 28. Namely, all metalized films 18 are superposed on each other such that the adjacent metallized films 18 are offset with respect to each other in the direction of their width. Accordingly, widthwise opposite side surfaces 30a and 30b of the film capacitor element 12 have gaps 32 which are laterally open in those side surfaces 30a and 30b. Each gap 32 is formed between widthwise end portions of the two metallized films 18 disposed on the respective opposite sides of another metallized film 18. The upper one of the adjacent two metallized films 18 defining each gap 32 is not superposed on a widthwise end portion of the vapor-deposited metal film 26 of the lower one of the adjacent two metallized films 18, so that the above-described widthwise end portion of the vapor-deposited metal film 26 of the lower metallized film 18 is exposed to the outside of the film capacitor element 12 through the gap 32.

As is apparent from FIG. 3, the metallized films 18 superposed on each other are not offset with respect to each other in the direction of their length, so that the lengthwise opposite end faces of all metallized films 18 are flush with each other along respective two planes parallel to the direction of the thickness of the metallized films 18.

The external electrodes 14a and 14b are formed by thermal spraying on the respective two widthwise opposite side surfaces 30a and 30b of the film capacitor element 12 (stack 20), which side surfaces 30a and 30b have the above-described gaps 32 formed therein. The external electrodes 14a and 14b fill the gaps 32 which are laterally open in the widthwise opposite side surfaces 30a and 30b of the film capacitor element 12, and are bonded to the above-described end portions of the vapor-deposited metal films 26 exposed to those gaps 32. Portions of the external electrode 14a filling the gaps 32 formed in the side surface 30a are defined as first connecting portions 33a, while portions of the other external electrode 14b filling the gaps 32 formed in the side surface 30b are defined as second connecting portions 33b. The plurality of first connecting portions 33a (4 first connecting portions 33a in this embodiment) and the plurality of second connecting portions 33b (4 second connecting portions 33b in this embodiment) are formed in the respective side surfaces 30a and 30b, such that the first and second connecting portions 33a and 33b are alternately arranged as seen in the direction of superposition of the resin films 24 and the vapor-deposited metal films 26. The material of the two external electrodes 14a and 14b is not particularly limited, and conventionally used materials such as zinc and aluminum are used as the material of the external electrodes 14a and 14b.

Thus, the two external electrodes 14a and 14b are formed so as to cover the entireties of the respective widthwise opposite side surfaces 30a and 30b of the film capacitor element 12 (stack 20), and are surely connected to the end portions of the vapor-deposited metal films 26 of the metallized films 18 at the first and second connecting portions 33a and 33b. Terminals or the like not shown are connected to the two external electrodes 14a and 14b, as necessary.

As shown in FIGS. 1-3, in the film capacitor 10 of this embodiment, entireties of two side surfaces 30c and 30d among the four side surfaces 30a, 30b, 30c and 30d of the film capacitor element 12 (stack 20) are covered by the respective cover films 16a and 16b and insulated from the outside of the film capacitor 10. The two side surfaces 30c and 30d are adjacent to the other two side surfaces 30a and 30b on which the external electrodes 14a and 14b are formed, and opposite to each other in the direction of the length of the film capacitor element 12 (right to left direction as seen in FIG. 3). The two cover films 16a and 16b are fusion-bonded to end faces of the resin films 24 of the metallized films 18 exposed at the above-described two side surfaces 30c and 30d.

Thus, the film capacitor 10 of this embodiment is configured to prevent generation of leakage current from the two side surfaces 30c and 30d, and to have a long creepage distance between the vapor-deposited metal films 26 of the metallized films 18, so that short-circuiting due to electric discharge between the vapor-deposited metal films 26 is advantageously prevented to increase the withstand voltage of the film capacitor 10. Further, the cover films 16a and 16b completely adhere to the end faces of the resin films 24 of the metallized films 18 exposed at the above-described two side surfaces 30c and 30d, so that entry of the water and the air between the cover films 16a and 16b and the end faces of the resin films 24 (end surfaces of the metallized films 18) is prevented.

The two cover films 16a and 16b are so-called polyolefin-based hot-melt films formed of a polyolefin-based hot-melt resin which belongs to the same system as polypropylene of the resin films 24 of the metallized films 18, and which has a high degree of thermal bondability (fusion bondability) with respect to polypropylene. In this embodiment, as the polyolefin-based hot-melt films, films formed of the polyolefin-based hot-melt resin having an olefin-based copolymer of polypropylene and paraffin as its major components are used. Owing to the use of the two cover films 16a and 16b formed of the above-described resin material, the cover films 16a and 16b are surely and strongly fusion-bonded to the end faces of the resin films 24 of the metallized films 18 exposed at the two side surfaces 30c and 30d of the film capacitor element 12.

Although the two cover films 16a and 16b need to be formed of the polyolefin-based hot-melt resin, the polyolefin-based hot-melt resin of the two cover films 16a and 16b is not particularly limited in terms of its specific kind and composition. Namely, various kinds of known polyolefin-based hot-melt resin can be used as the material of the two cover films 16a and 16b.

To form the two cover films 16a and 16b of the polyolefin-based hot-melt resin so as to cover the entireties of the side surfaces 30c and 30d of the film capacitor element 12, methods described below are employed, for example.

Namely, there may be employed a first method in which the cover films 16a and 16b are formed with a predetermined thickness by spraying the polyolefin-based hot-melt resin melted by heating, onto the entireties of the side surfaces 30c and 30d of the film capacitor element 12 by using a nozzle, or coating those side surfaces 30c and 30d with the above-described resin in the molten state by using a roller or the like, while the resin films 24 of the metallized films 18 are melted by the heat of the polyolefin-based hot-melt resin in the molten state, at their end portions including their end faces exposed at the above-described side surfaces 30c and 30d of the film capacitor element 12. Then, the thus formed cover films 16a, 16b and the above-described end portions of the resin films 24 are cooled and solidified, whereby the two cover films 16a and 16b in the form of the polyolefin-based hot-melt films are formed so as to cover the entireties of the respective side surfaces 30c and 30d of the film capacitor element 12, and fusion-bonded to the end faces of the resin films 24.

Further, there may be employed a second method in which the polyolefin-based hot-melt films are superposed on the side surfaces 30c and 30d of the film capacitor element 12 so as to cover the entireties of those surfaces 30c and 30d, and melted by heating, while the resin films 24 of the metallized films 18 are melted at their end portions including their end faces exposed at the above-described side surfaces 30c and 30d of the film capacitor element 12, and thereafter cooling and solidifying the polyolefin-based hot-melt films and the above-described end portions of the resin films 24. This method also permits formation of the two cover films 16a and 16b, such that the cover films 16a and 16b cover the entireties of the side surfaces 30c and 30d of the film capacitor element 12, and are fusion-bonded to the end faces of the resin films 24. In this respect, it is noted that the polyolefin-based hot-melt films superposed on the side surfaces 30c and 30d of the film capacitor element 12 may take the form of extruded members which are formed by an extrusion process using a suitable die or the like, and which are in a semi-molten state, for example, as well as the generally used form of films.

Although the thickness of each of the cover films 16a and 16b formed on the respective side surfaces 30c and 30d of the film capacitor element 12 as described above is not particularly limited, the cover films 16a and 16b preferably have a thickness between about 2.0 μm and about 4.0 μm. Where the cover films 16a and 16b have a thickness smaller than 2.0 μm, it is difficult to secure a sufficiently long creepage distance between the vapor-deposited metal films 26 of the metallized films 18, due to the excessively small thickness of the cover films 16a and 16b, giving rise to a risk of difficulty in sufficiently increasing the withstand voltage of the film capacitor 10 by increasing the creepage distance. On the other hand, even where the cover films 16a and 16b have a thickness larger than 4.0 μm, it is difficult to expect a further improvement of the effects achieved by the formation of the cover films 16a and 16b, and there even arises a risk of an increase of a cost of formation of the cover films 16a and 16b. Accordingly, it is preferable to select the thickness of the cover films 16a and 16b so as to be not larger than 4.0 μm.

By the way, the polyolefin-based hot-melt resin of the two cover films 16a and 16b need to have at least the same melting point as polypropylene of the resin films 24 of the metallized films 18, so that the end faces of the resin films 24 are melted by the heat while the cover films 16a and 16b are fusion-bonded to those end faces. In this embodiment, the polyolefin-based hot-melt resin having a melting point which is higher than that of polypropylene of the resin films 24 and lower than a pyrolysis temperature of polypropylene is suitably used as the material of the two cover films 16a and 16b, for reasons described below.

Namely, the film capacitor element 12 is generally produced by: superposing a plurality of elongate metallized films 18 on each other, such that the adjacent metallized films 18 are offset with respect to each other in the direction of their width, thereby forming an elongate stack 20 of the plurality of metallized films 18; superposing elongate protective films 22a and 22b on respective opposite surfaces of the elongate stack 20, thereby forming an elongate capacitor element preform; and cutting the elongate capacitor element preform in its width direction at plural positions which are spaced apart from each other by a predetermined distance in the direction of the length of the capacitor element preform, by using a cutting blade such as a rotary saw blade, thereby producing a plurality of film capacitor elements 12 at once. The widthwise opposite side surfaces 30a and 30b of each of the thus obtained film capacitor elements 12 serve as the side surfaces on which the two external electrodes 14a and 14b are to be formed, while the lengthwise opposite side surfaces 30c and 30d of each film capacitor element 12, along which side surfaces 30c and 30d the plurality of film capacitor elements 12 are cut out from the capacitor element precursor, serve as the side surfaces on which the two cover films 16a and 16b are to be formed.

Accordingly, in the thus obtained film capacitor element 12, the lengthwise opposite side surfaces 30c and 30d on which the cover films 16a and 16b are to be formed, and the end faces of the resin films 24 of the metallized films 18 exposed at those side surfaces 30c and 30d are often rough surfaces having a number of concave portions and convex portions in the form of cut traces formed with the cutting blade. Where the concave portions and convex portions respectively have an excessively large depth and an excessively large height, there arises a risk that while the cover films 16a and 16b are fusion-bonded to the end faces of the resin films 24, the molten resin of the cover films 16a and 16b cannot reach the deepest part of the concave portions formed in the end faces of the resin films 24, resulting in formation of small gaps (air pockets) at the bottoms of the concave portions. The presence of those gaps between the end faces of the resin films 24 and the cover films 16a and 16b results in a failure of the cover films 16a and 16b to conform to the resin films 24 when thermal contraction of the resin films 24 is caused by a change in the ambient temperature of the surrounding atmosphere of the film capacitor 10 or the like. Therefore, the sizes of those gaps are gradually increased by repeated changes in the ambient temperature, giving rise to a risk of deterioration of adhesiveness of the cover films 16a and 16b with respect to the end faces of the resin films 24 and the side surfaces 30c and 30d of the film capacitor element 12. Further, there even arises a risk that the water and the air enter the gaps between the end faces of the resin films 24 and the cover films 16a and 16b, leading to deterioration of the resin films 24 and the vapor-deposition metal films 26 and reduction of the withstand voltage of the film capacitor 10.

Therefore, it is preferable that the polyolefin-based hot-melt resin of the cover films 16a and 16b has the melting point higher than that of polypropylene of the resin films 24, so that the convex portions existing on the end faces of the resin films 24 are melted by the heat of the polyolefin-based hot-melt resin of the cover films 16a and 16b in the molten state when the cover films 16a and 16b are fusion-bonded to the end faces of the resin films 24 of the metallized films 18 (when the cover films 16a and 16b are formed on the respective side surfaces 30c and 30d of the film capacitor element 12). Where the cover films 16a and 16b are formed of the polyolefin-based hot-melt resin having the melting point described above, the convex portions on the end faces of the resin films 24 are melted by the heat of the polyolefin-based hot-melt resin in the molten state when the cover films 16a and 16b are fusion-bonded to those end faces of the resin films 24, resulting in reduction of the height of the convex portions, and reduction of the depth of the concave portions existing in those end faces of the resin films 24. Accordingly, the polyolefin-based hot-melt resin in the molten state reaches the deepest part of the concave portions in the end faces of the resin films 24, so that no gaps are formed between the end faces of the resin films 24 and the cover films 16a and 16b, and the above-described concave portions are filled with the polyolefin-based hot-melt resin in the molten state. As a result, sufficiently high adhesiveness between the cover films 16a and 16b and the end faces of the resin films 24 and the side surfaces 30c and 30d of the film capacitor element 12 can be assured with a high degree of stability, while the problems of deterioration of the resin films 24 and the vapor-deposited metal films 26 and reduction of the withstand voltage of the film capacitor 10 due to entry of the water or the air between the end faces of the resin films 24 and the cover films 16a and 16b can be extremely surely prevented.

However, where the melting point of the polyolefin-based hot-melt resin of the cover films 16a and 16b is higher than that of polypropylene of the resin films 24 by an excessively large amount, there arises a risk that polypropylene of the resin films 24 is thermally decomposed by the heat of the polyolefin-based hot-melt resin in the molten state when the cover films 16a and 16b are fusion-bonded to the end faces of the resin films 24, resulting in reduction of the performance of the film capacitor 10.

Accordingly, in the present embodiment, the polyolefin-based hot-melt resin having the melting point which is not lower than that of polypropylene of the resin films 24 and which is lower than the pyrolysis temperature of polypropylene is preferably used as the resin material of the cover films 16a and 16b. Specifically, the polyolefin-based hot-melt resin advantageously used as the resin material of the cover films 16a and 16b in this embodiment has the melting point which is not lower than the melting point of 136° C. of polypropylene and which is lower than the pyrolysis temperature of 220° C. of polypropylene.

In short, the use of the cover films 16a and 16b formed of the resin material described above makes it possible to assure the sufficiently high adhesiveness between the end faces of the resin films 24 and the cover films 16a and 16b with a high degree of stability, and to extremely surely prevent the problems of deterioration of the resin films 24 and the vapor-deposited metal films 26 and reduction of the withstand voltage of the film capacitor 10 due to entry of the water or the air between the end faces of the resin films 24 and the cover films 16a and 16b, without causing reduction of the performance of the film capacitor 10 due to thermal decomposition of the resin films 24.

Further, in order to increase the adhesiveness between the resin films 24 and the cover films 16a and 16b, and to prevent the problems of deterioration of the resin films 24 and the vapor-deposited metal films 26 and reduction of the withstand voltage of the film capacitor 10, it is important that the concave portions existing in the end faces of the resin films 24 are filled with the polyolefin-based hot-melt resin in the molten state when the cover films 16a and 16b are fusion-bonded to the end faces of the resin films 24 of the metallized films 18 (side surfaces 30c and 30d of the film capacitor element 12), as described above. In order to increase a ratio of filling of the concave portions with the polyolefin-based hot-melt resin in the molten state, it is important that the polyolefin-based hot-melt resin used as the resin material of the cover films 16a and 16b has a low viscosity and a high degree of fluidity in the molten state, as well as the high melting point.

Accordingly, the polyolefin-based hot-melt resin having a melt viscosity within a range between about 860 mPa·s and about 34000 mPa·s at 160-180° C. is suitably used as the resin material of the cover films 16a and 16b. Where the resin material of the cover films 16a and 16b has a melt viscosity higher than 34000 mPa·s at 160-180° C., the fluidity of the resin material in the molten state is excessively low due to its excessively high melt viscosity, so that the concave portions in the end faces of the resin films 24 of the metallized films 18 are not sufficiently filled with the resin material, resulting in formation of the gaps at the bottoms of the concave portions, and giving rise to a risk of the problems such as reduction of adhesiveness between the resin films 24 and the cover films 16a and 16b, deterioration of the resin films 24 and the vapor-deposited metal films 26, and reduction of the withstand voltage of the film capacitor 10. On the other hand, where the resin material of the cover films 16a and 16b has a melt viscosity lower than 860 mPa·s at 160-180° C., the fluidity of the resin material in the molten state is excessively high, so that it is difficult to keep the predetermined thickness of the cover films 16a and 16b constituted by the resin material in the molten state, until the resin material is solidified, giving rise to a risk that the cover films 16a and 16b has a thickness smaller than the desired value. An extremely small thickness of the cover films 16a and 16b results in defects as described above.

It will be understood from the foregoing description that in the film capacitor 10 of this embodiment, the two cover films 16a and 16b are formed so as to cover the entireties of the two side surfaces 30c and 30d other than the side surfaces 30a and 30b on which the external electrodes 14a and 14b are formed, whereby generation of leakage current from the two side surfaces 30c and 30d is substantially prevented. Further, in the film capacitor 10 of this embodiment, the creepage distance between the vapor-deposited metal films 26 of the metallized films 18 is advantageously increased. Moreover, the two cover films 16a and 16b are formed of the polyolefin-based hot-melt resin, and fusion-bonded to the end faces of the resin films 24 formed of polypropylene, which end faces are exposed at the above-described two side surfaces 30c and 30d, so that the end faces of the resin films 24 of the metallized films 18 and the cover films 16a and 16b completely adhere to each other, in the absence of small gaps therebetween, whereby entry of the water vapor and the air between the end faces of the resin films 24 and the cover films 16a and 16b is extremely effectively and surely prevented. As a result, deterioration of the resin films 24 and the vapor-deposited metal films 26 due to their contact with the water vapor can be advantageously prevented. Also, reduction of the withstand voltage of the film capacitor due to electric discharge between the vapor-deposited metal films 26 can be advantageously solved, owing to prevention of entry of the water vapor and the air between the end faces of the resin films 24 and the cover films 16a and 16b, and the increased creepage distance between the vapor-deposited metal films 26.

Further, in the film capacitor 10, the above-described excellent characteristics can be achieved by merely forming the cover films 16a and 16b in the form of the resin films having a small thickness on the respective two side surfaces 30c and 30d of the film capacitor 10. Therefore, the size of the film capacitor 10 as a whole and its required cost are not increased to achieve the above-described characteristics.

Therefore, in the film capacitor according to this embodiment, generation of leakage current can be substantially prevented, the desired performance can be maintained with a high degree of stability for a longer period of time, and the withstand voltage can be advantageously increased, without undesirable increases of the size and the production cost of the film capacitor.

Although one embodiment of the invention has been described for illustrative purpose only, the invention is by no means limited to the details of the illustrated embodiment.

For instance, a stack may be formed by superposing: metallized films each constituted by a polypropylene film as a dielectric film and vapor-deposited metal films formed on the respective opposite major surfaces of the polypropylene film; and polypropylene films not provided with the vapor-deposited metal films or resin films other than the polypropylene films, such that the polypropylene films or the other resin films and the vapor-deposited metal films are alternately arranged.

Also, the number of the dielectric film(s) and the vapor-deposited metal films which constitute the stack are not particularly limited, as long as the stack is constituted by at least one dielectric film and at least two vapor-deposited metal films, which are alternately superposed on each other.

In the above-described embodiment, the cover films 16a and 16b are formed on the respective two side surfaces 30c and 30d of the film capacitor element 12 (stack 20), such that the cover films 16a and 16b cover the entireties of the respective two side surfaces 30c and 30d and the entireties of respective opposite end faces of the external electrodes 14a and 14b exposed at the respective side surfaces 30c and 30d. However, the opposite end faces of the external electrodes 14a and 14b need not be covered by the cover films 16a and 16b.

In the above-described embodiment, the specific example of the invention applied to the film capacitor for an automotive vehicle was described. However, it goes without saying that the invention is also advantageously applicable to various kinds of film capacitor other than the film capacitor for the automotive vehicle.

It is to be understood that the invention may be embodied with various changes, modifications and improvements which are not illustrated herein and which may occur to those skilled in the art, without departing from the spirit of the invention, and that such changes, modifications and improvements are also within the scope of the invention.

The invention claimed is:

1. A film capacitor constituted by: a stack of at least one dielectric film in the form of a polypropylene film and a plurality of vapor-deposited metal films which are superposed on each other such that the at least one dielectric film and the plurality of vapor-deposited metal films are alternately arranged; protective films superposed on respective opposite surfaces of the stack as seen in a direction of superposition of the at least one dielectric film and the plurality of vapor-deposited metal films; and two external electrodes formed on respective opposite side surfaces of the stack as seen in a direction perpendicular to the direction of superposition of the at least one dielectric film and the plurality of vapor-deposited metal films, wherein
cover films are formed of a polyolefin-based hot-melt resin on respective opposite side surfaces of the stack other than said side surfaces on which said two external electrodes are formed, such that the cover films cover entireties of those side surfaces and are fusion-bonded to end portions of said at least one dielectric film exposed at those side surfaces.

2. The film capacitor according to claim 1, wherein the cover films have: a melting point which is not lower than that of polypropylene of said at least one dielectric film and lower than a pyrolysis temperature of polypropylene; and a melt viscosity within a range of 860-34000 mPa·s at 160-180° C.

3. The film capacitor according to claim 1, wherein gaps are formed in said opposite side surfaces of the stack as seen in the direction perpendicular to the direction of superposition of the at least one dielectric film and the plurality of vapor-deposited metal films, such that the gaps are open outwards and parts of the plurality of vapor-deposited metal films are exposed to the outside of the stack through the gaps, and portions of said two external electrodes formed on said respective opposite side surfaces of the stack fill the gaps, and said portions of one of said two external electrodes filling the gaps formed in one of said respective opposite side surfaces of the stack are defined as first connecting portions connecting said one external electrode formed on said one side surface of the stack to said parts of the vapor-deposited metal films exposed to the gaps, while said portions of the other of said two external electrodes filling the gaps formed in the other of said respective opposite side surfaces of the stack are defined as second connecting portions connecting said other external electrode formed on said other side surface of the stack to said parts of the vapor-deposited metal films exposed to the gaps, wherein said first connecting portions and said second connecting portions are alternately arranged as seen in the direction of superposition of the at least one dielectric film and the plurality of vapor-deposited metal films.

* * * * *